US005644915A

United States Patent [19]

Dressing et al.

[11] Patent Number: 5,644,915

[45] Date of Patent: Jul. 8, 1997

[54] CONTROL SYSTEM FOR A HYDRAULIC PRESS BRAKE

[75] Inventors: Paul A. Dressing; Dean M. Valvano, both of Cincinnati, Ohio

[73] Assignee: Cincinnati, Incorporated, Harrison, Ohio

[21] Appl. No.: 637,447

[22] Filed: Apr. 25, 1996

[51] Int. Cl.[6] .......................... F16D 31/02; F15B 11/00

[52] U.S. Cl. .......................... 60/426; 60/494; 91/31; 91/32; 91/361; 91/451; 91/519; 91/458

[58] Field of Search .......................... 91/6, 31, 32, 361, 91/443, 449, 451, 452, 519, 458; 60/426, 427, 395, 494

[56] References Cited

U.S. PATENT DOCUMENTS

| | | | |
|---|---|---|---|
| 3,104,591 | 9/1963 | Cudnohufsky | 91/519 X |
| 4,524,582 | 6/1985 | Lucas et al. | |
| 4,602,481 | 7/1986 | Robinson | 91/519 |
| 4,721,028 | 1/1988 | Lucas et al. | |
| 5,014,596 | 5/1991 | Martin | 91/6 |
| 5,325,761 | 7/1994 | Schwing | 91/31 |
| 5,419,236 | 5/1995 | Plettner | 91/451 X |

FOREIGN PATENT DOCUMENTS

| | | | |
|---|---|---|---|
| 1000616 | 3/1983 | U.S.S.R. | 91/31 |
| 1455060 | 1/1989 | U.S.S.R. | 91/493 |

*Primary Examiner*—Hoang Nguyen
*Attorney, Agent, or Firm*—Frost & Jacobs

[57] ABSTRACT

A control system for controlling the movement of the ram of a press or press brake of the type having one or two main cylinders with pistons operatively attach to the ram. The control system comprises a programmable processor with inputs from a pressure transducer indicating the pressure applied to the one or two pistons and a linear potentiometer for each side of the ram to indicate ram position and levelness. The control system further includes a hydraulic circuit operated by outputs from the processor. The hydraulic circuit comprises a variable volume load sense-controlled pump supplying hydraulic fluid through a speed control assembly to a solenoid-actuated directional valve determining upward and downward movement of the ram. The speed control assembly comprises at least two lines connected to the output line of the pump and to the speed control assembly output line to the directional valve. At least one of the at least two speed control assembly lines is provided with a restricting orifice. At least one of the at least two speed control assembly lines is provided with a normally closed solenoid-actuated valve. All of the solenoid actuated valves of the hydraulic circuit are controlled by outputs from the processor.

21 Claims, 11 Drawing Sheets

ORIFICE DIAMETERS

| MACHINE SIZE TONS | LOW SPEED ORIFICE 34 | MEDIUM SPEED ORIFICE 35 | DECOMPRESSION ORIFICE 90 |
|---|---|---|---|
| 90 | .082 | .082 | .082 |
| 135 | .099 | .099 | .099 |
| 175 | .099 | .099 | .099 |
| 230 | .113 | .113 | .113 |
| 350 | .113 | .113 | .113 |

| SOLE-NOID | POWER UP AND IDLE | RAPID APP-ROACH | FORM-ING LOW | FORM-ING MED. / SET-UP | FORM-ING HI | RE-TURN LOW/ SET-UP | RE-TURN HI | DOWN STROKE STOP | UP STROKE STOP | DE-COMP | EMER STOP |
|---|---|---|---|---|---|---|---|---|---|---|---|
| 42 | — | X | X | X | X | — | — | — | — | — | — |
| 43 | — | — | — | — | — | X | X | — | — | — | — |
| 37 | — | X | — | X | X | — | X | — | — | — | — |
| 39 | — | X | — | — | X | — | X | — | — | — | — |
| 102 | — | — | X | X | X | — | — | — | X | X | — |
| 60 | — | X | X | X | X | — | — | — | — | — | — |
| 79 | — | —/X | —/X | —/X | —/X | —/X | —/X | —/X | —/X | —/X | — |
| 80 | — | —/X | —/X | —/X | —/X | —/X | —/X | —/X | —/X | —/X | — |
| 91 | — | — | — | — | — | — | — | — | — | X | — |

FIG. 3

CONTROL SYSTEM FOR A HYDRAULIC PRESS BRAKE

TECHNICAL FIELD

The invention relates to a control system for a hydraulic press brake or the like, and more particularly to a programmable processor controlled hydraulic circuit having an improved speed control assembly.

Early presses and press brakes were mechanically actuated and were characterized by high cycle times, but were capable of minimal adjustments.

For some time, attention has been turned to hydraulically actuated presses and press brakes which overcome a number of the problems encountered with mechanical presses and press brakes, but are characterized by relatively slow cycle times. To correct this, prior art workers have developed improved control systems for controlling the movement of the press slide or press brake ram with various speed options available for approach of the ram to the workpiece, movement of the ram during forming of the workpiece, and for the return or upstroke of the ram.

The prior art control systems generally required both a high volume fixed displacement pump and a low volume fixed displacement pump. U.S. Pat. No. 4,721,028 is exemplary of patents teaching improved control systems for hydraulic presses and the like. The reference is of interest in that it teaches the use of a prefill system and the use of a counterbalance system to prevent unexpected downward movement of the ram. While this patent teaches moving the ram at various preselected speeds through its approach, its work stroke and its return stroke, the number and combination of speeds are somewhat limited. The present invention is based upon the discovery that through the use of a single variable volume pump and a unique speed control assembly, improved performance (including accuracy and speed), reliability and efficient operating costs can be achieved at a lower cost. The control system of the present system may incorporate prefill valves and counterbalance valves with all of the advantages achievable therewith.

While with certain circuit changes well within the skill of the worker in the art, the control system of the present invention could be applied to a single cylinder press or any hydraulically actuated system that reacts to a load, it is particularly adapted to a press brake having a ram actuated by two hydraulic cylinders, and for purposes of an exemplary showing will be described in this application of the invention.

DISCLOSURE OF THE INVENTION

According to the invention there is provided a control system for the ram of a hydraulic press or press brake of the type having one or two main cylinders with one or two pistons operatively attached to the ram. The control system comprises means to shift the ram downwardly and upwardly at preselected speeds; to cause reversal of the downward travel of the ram at a preselected point determined on the basis of slide position or tonnage; and to optimize decompression of hydraulic pressure immediately prior to ram reversal.

The control system comprises a programmable processor with inputs from the operator, a pressure transducer indicating the pressure applied to the one or two pistons, and a linear potentiometer associated with each side of the ram to indicate ram vertical position. The control system further includes a hydraulic circuit operated by outputs from the processor. The hydraulic circuit comprises a variable volume load sense-controlled pump supplying hydraulic fluid through a speed control assembly to a solenoid-actuated directional valve determining upward and downward movement of the ram. The speed control assembly comprises at least two lines connected to the output line of the pump and to the speed control assembly output line to the directional valve. At least one of the at least two speed control assembly lines is provided with a restricting orifice. At least one of the at least two speed control assembly lines is provided with a normally closed solenoid-actuated valve. All of the solenoid-actuated valves of the hydraulic circuit are controlled by outputs from the processor.

The hydraulic circuit may also include a solenoid-actuated leveling valve when two cylinder and piston assemblies are used to shift the ram. The hydraulic circuit may also include prefill valves, and counterbalance valves, together with a decompression valve as is well known in the art.

BRIEF DESCRIPTION OF THE DRAWINGS

FIG. 3 is a table indicating various modes of operation of the control system, and the state of each of the valve-actuating solenoids of the system for each mode.

DETAILED DESCRIPTION OF THE INVENTION

Figures 1, 12:
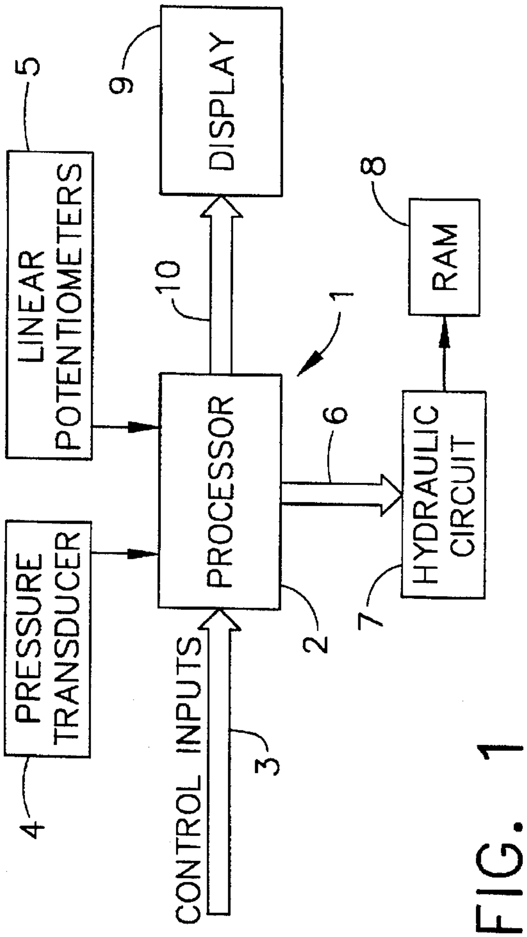
FIG. 1 is a diagrammatic representation of the overall control system of the present invention.
FIG. 12 is a table setting forth various orifice sizes for the speed control assembly for use in different sizes of press brakes.

Reference is first made to the block diagram of FIG. 1. This block diagram illustrates the control system of the present invention, generally indicated at 1. The system is under the control of a programmable signal processor 2. As used herein and in the claims, the term "processor" refers to a microprocessor, a computer, a microcomputer, or other circuit capable of handling inputs and outputs to control a plurality of peripheral devices in accordance with a preprogrammed routine.

User initiated control inputs 3 may be provided to processor 2 to set the operating parameters of the hydraulic press brake. For example, manual controls, not shown, may be associated with the press brake to permit the user to select the up and down stroke speeds of the ram, the position at which the stroke is reversed, or the tonnage at which the stroke is reverse. Other user controlled inputs may also be provided to processor 2, depending upon the particular features desired with the press brake.

A pressure transducer 4 is provided which measures the oil pressure in the hydraulic lines serving the ram to provide an indication of the actual pressure or tonnage being exerted against the workpiece. When the workpiece is centered, tonnage thereon may be read directly. When the workpiece is off center, the tonnage is calculated taking into account the off center distance. As will be described in more detail hereinafter, the signal from the pressure transducer 4 may be used in connection with the program associated with processor 2 to permit the operator to reverse the stroke of the ram at any preselected tonnage value within the operating capacity of the press brake. The signal from the pressure transducer 4 is also used in the determination of proper decompression times.

A linear potentiometer is coupled to either side of the press brake ram to provide an input signal to processor 2 indicative of the vertical positions of the ram sides. These signals are used to constantly control the level of the ram. They are also used in connection with the internal processing of the processor 2 to permit the operator to reverse the direction of ram travel at any predetermined vertical position point, as will be apparent hereinafter.

A plurality of outputs 6 from processor 2 are used to control the hydraulic circuit 7 which routes the flow of hydraulic fluid to control the movement and pressure applied to the press brake ram 8. Hydraulic circuit 7 will be described in detail hereinafter.

Finally, the operational status of control system 1 may be provided on a visual display 9. For example, output signals 10 from processor 2 may provide a visual display of ram position, tonnage and the like.

Figure 2:
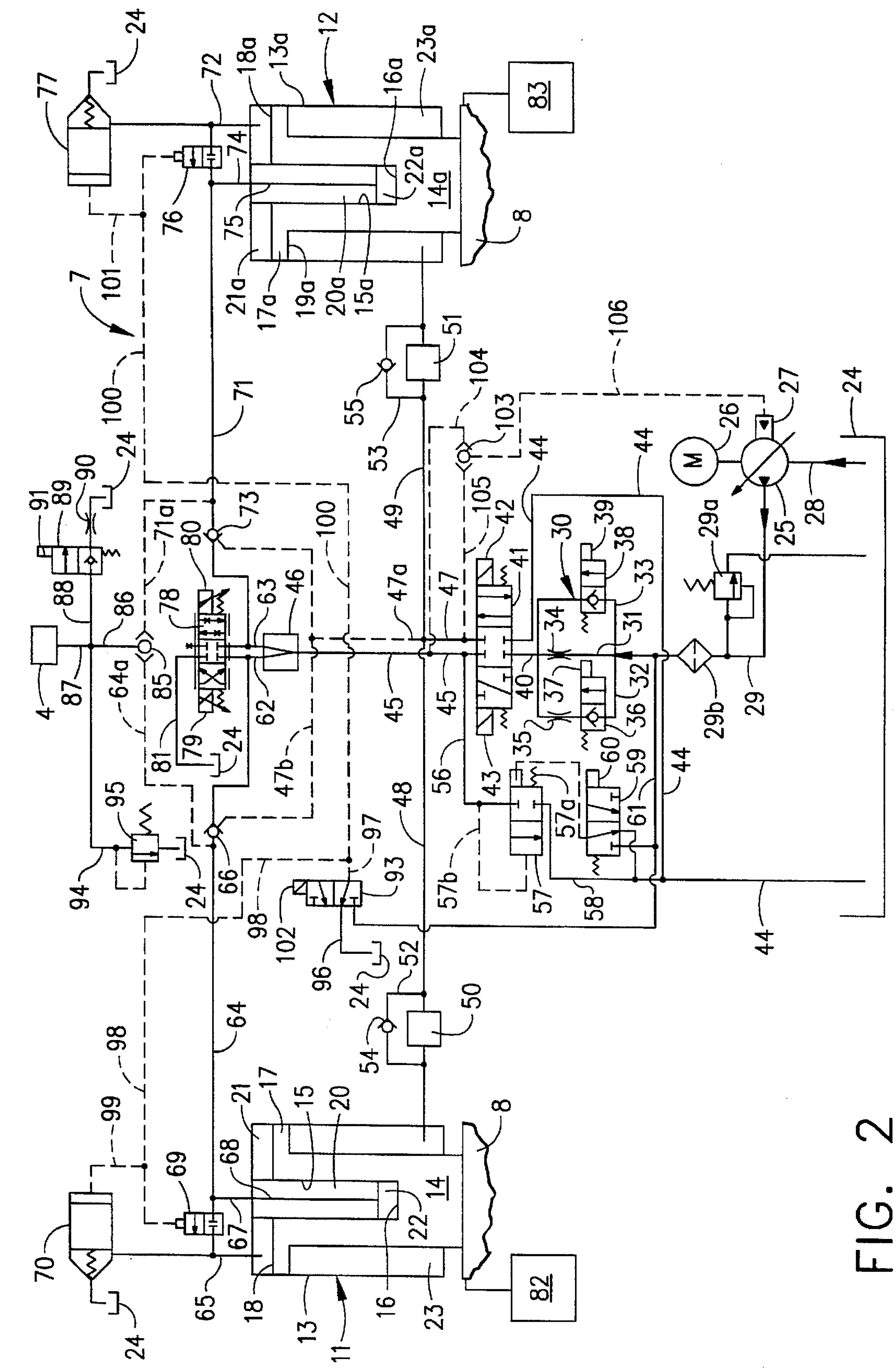
FIG. 2 is a schematic diagram of the hydraulic circuit of the control system of the present invention.

Reference is now made to FIG. 2, wherein the hydraulic circuit of the present invention is schematically illustrated. Throughout the drawings, like parts have been given like index numerals.

The ram 8 is operatively attached near its upper ends to the pistons of a pair of cylinder assemblies 11 and 12. Cylinder assembly 11 comprises a cylinder 13 and a piston 14. The piston 14 has a central bore 15 terminating in a small working surface area 16. The upper end of piston 14 is enlarged to form a plate-like annular flange 17. The upper surface of the piston provides a large, annular, working area surface 18. The underside of flange 17 provides a flat, annular, working surface 19.

The cylinder 13 is provided with a downwardly depending, fixedly mounted, generally cylindrical plunger 20, dimensioned to be slidingly received within piston bore 15.

The cylinder assembly 12 is substantially identical to cylinder assembly 11. As a consequence, like parts have been given the same index numerals followed by "a" in cylinder assembly 12. Thus, cylinder assembly 12 comprises a cylinder **13*a* having a piston 14*a* with a central axial bore 15*a* to accommodate a plunger 20*a*. Piston 14*a* has a small working surface 16*a* at the lower end of bore 15*a*. Piston 14*a* has a flange 17*a* together with an upper annular working surface 18*a* and a lower annular working surface 19*a***.

Pistons 14 and **14*a* located within their respective cylinders 13 and 13*a* form upper annular volumes 21 and 21*a*, respectively at the top of the cylinder, lower volumes 22 and 22*a* at the lower end of their respective plungers 20 and 20*a*, and outer annular volumes 23 and 23*a* beneath their respective flange lower surfaces 19 and 19*a*. The purpose and function of these volumes will be apparent hereinafter. In general, however, when hydraulic fluid under pressure is introduced into the upper annular volumes 21 and 21*a*, the pistons 14 and 14*a* and ram 8 will move downwardly. Similarly, when hydraulic fluid under pressure is introduced into lower volumes 22 and 22*a*, pistons 14 and 14*a* together with ram 8 will move downwardly, although with less force since the total surface area of small working surfaces 16 and 16*a* is smaller than the total area of larger working surfaces 18 and 18*a*. Pistons 14 and 14*a* together with ram 8 may be caused to move upwardly by introducing hydraulic fluid under pressure into the outer annular volumes 23 and 23*a* such that a force is created against the working surfaces 19 and 19*a* of pistons 14 and 14*a***.

The hydraulic fluid used within the overall hydraulic circuit 7 is retained in a suitable reservoir 24. For purposes of simplifying the diagram of FIG. 2, reservoir 24 has been indicated at seven different positions within the diagram. It will be understood by one skilled in the art that each indication of reservoir 24 represents the same single hydraulic fluid reservoir. The hydraulic circuit portion 7 of the control system 1 for a press brake is provided with a variable volume piston pump 25 driven by a motor 26 and provided with a load sensing control 27. In an exemplary embodiment, a 15 horsepower motor 26 was used and the variable volume pump was set for an operational range of 300 to 3400 p.s.i. While a fixed volume pump could be substituted for the variable volume piston pump, necessitating some changes in the overall circuit (well within the ability of the skilled worker in the art), the variable volume piston pump is preferred because it will output only what is needed, i.e. the flow and pressure required to balance the load. As a consequence, the variable volume piston pump is more efficient in this circuit.

The inlet of pump 25 is connected to reservoir 24 by line 28. The output of pump 25 is connected by line 29 to a speed control assembly generally indicated at 30.

It will be understood that the reservoir 24 may include a cooling circuit (not shown) for cooling the hydraulic fluid, as is known in the art. The output line 29 of pump 25 may be connected to a relief valve **29*a* protecting the system from overload. In the previously mentioned exemplary embodiment, the relief valve 29*a* was preset to activate at a pressure of 3600 p.s.i. The pump 25, itself, has built-in overload protection, as is well known in the art. The output line 29 also may contain a high pressure oil filter 29*b*. The purpose of the oil filter 29*b*** is to protect the various valves in the circuit. The leveling valve, to be described hereinafter, is particularly sensitive to dirt.

As indicated above, the output line 29 of pump 25 leads to a speed control assembly 30. Speed control assembly 30 comprises three lines 31, 32 and 33. Line 31 contains a restrictive orifice 34. Line 32 contains a larger restrictive orifice 35. Line 32 also contains a normally closed two-position valve 36 shiftable to an open position by solenoid 37. The third line 33 contains no restrictive orifice but is provided with a normally closed two-position valve 38 shiftable to an open position by solenoid 39. The three lines 31, 32 and 33 of speed control assembly 30 merge into a speed control assembly output line 40 leading to a directional valve 41. Directional valve 41 is a normally centered three position valve actuated by a pair of solenoids 42 and 43.

As is evident from FIG. 2, directional valve 41 is connected to the output 40 of speed control assembly 30 and to a line 44 leading to reservoir 24. Directional valve 41 is also connected to a line 45 leading to the input of a flow divider 46. Finally, a line 47 is connected to directional valve 41 and leads to lines 48 and 49 which are respectively connected to the volume 23 of cylinder assembly 11 and volume **23*a* of cylinder assembly 12**.

It will be noted that the lines 48 and 49 contain counterbalance valves 50 and 51, respectively. Counterbalance valves 50 and 51 are provided with by-pass lines 52 and 53, respectively, containing check valves 54 and 55, respectively. As a consequence of this structure, when the volumes 23 and **23*a* of cylinder assemblies 11 and 12 are filled via lines 48 and 49 (as will be discussed in greater detail hereinafter), the hydraulic fluid in lines 48 and 49 will by-pass counterbalanced valves 50 and 51 via by-pass lines 52 and 53. On the other hand, when the volumes 23 and 23*a* are drained by means of lines 48 and 49, the draining fluid will pass through counterbalance valves 50 and 51. In the above-mentioned exemplary embodiment, check valves 54 and 55 constitute a part of counterbalance valves 50 and 51, respectively. Thus hydraulic fluid passes through the counterbalance valves 50 and 51 both to and from cylinder volumes 23 and 23***a*. The flow to cylinder volumes 23 and 23*a* is a free flow.

The counterbalance valves 50 and 51 can be set to remain closed until a desired predetermined pressure is reached within the volumes 23 and 23*a*. As a result, the counterbalance valves 50 and 51 operate to maintain a threshold pressure on the bottom surfaces 19 and 19*a* of pistons 14 and 14*a*. In this way, the counterbalance valves 50 and 51 assure that the weight of pistons 14 and 14*a*, ram 8 and any associated tooling is supported. This counterbalance feature reduces the possibility that the slide 8 could fall unexpectedly.

Returning to line 45 which extends between directional valve 41 and flow divider 46, it will be noted that there is a branch line 56 extending therefrom and leading to a dumping valve 57. The dumping valve has two positions. In its open position, it connects line 56 to a line 58 which, in turn, connects with line 44 to reservoir 24. While dumping valve 57 could constitute a two-position, normally open, solenoid-actuated valve, it is a relatively large valve and preferably is operated by a pilot valve 59. When there is no pressure in lines 45 and 56, the dumping valve 57 will be closed as shown by virtue of spring 57*a*. When pressure is present in lines 45 and 56, this pressure will be used by line 57*b* to shift dumping valve to its open position overcoming relatively weak spring 57*a*. Thus, for most purposes, dumping 57 may be considered a normally open valve. Pilot valve 59 is operated by solenoid 60 and is connected to a source of hydraulic fluid by line 61 branching from pump output line 29. When pilot valve 59 is shifted to its actuating position by solenoid 60, hydraulic fluid from pump outlet line 29 and line 61 will be directed to dumping valve 57 to shift the dumping valve from its open position to its closed position.

It will be understood that solenoid 37 of valve 36, solenoid 39 of valve 38, solenoid 60 of pilot valve 59 and solenoids 42 and 43 of directional valve 41 will all be actuated directly by outputs from processor 2 (see FIG. 1). When directional valve 41 is shifted to the right (as viewed in FIG. 2) by solenoid 43, pistons 14 and 14*a* and ram 8 will move upwardly. When directional valve 41 is shifted to the left as viewed in FIG. 2 by solenoid 42, ram 8 and pistons 14 and 14*a* will move downwardly. As indicated above, solenoid 42 of directional valve 41 is actuated by an output signal from the processor 2, as is directional valve solenoid 43. In the case of solenoid 42, however, the output from processor 2 passes through a pair of palm switches or a foot switch (not shown) which must be closed in order for solenoid 42 to be energized. This is a safety precaution to prevent the operator of the press brake from being injured.

Hydraulic fluid passing through line 45 to flow divider 46 is equally split between flow divider lines 62 and 63. Flow divider line 62 is connected to line 64 which extends therefrom and is ultimately connected to line 65. Line 64 contains a first check valve 66 which normally prevents the flow of hydraulic fluid through line 64 to line 62. Line 64 is connected by a line 67 to a passage 68 extending longitudinally through plunger 20 of cylinder assembly 11 to volume 22. Adjacent line 65, line 64 is provided with a switching element 69 which may take the form of a pilot actuated normally closed blocking valve and which normally prevents flow from line 64 to line 65. Line 65 extends between the upper annular volume 21 of cylinder assembly 11, to reservoir 24 through normally open prefill valve 70.

In a similar fashion, flow divider line 63 is connected to line 71 which extends therefrom to line 72. Line 71 is equivalent to line 64 and contains a first check valve 73 equivalent to check valve 66 and normally preventing flow in line 71 toward flow divider line 63. A line 74, equivalent to line 67, extends from line 71 to a bore 75 (equivalent to bore 68) extending longitudinally through plunger 20*a* and communicating with volume 22*a*. Between line 74 and line 72 there is a switching element 76 equivalent to switching element 69. Switching element 76 normally prevents the flow of fluid from line 71 to line 72.

Line 72 is equivalent to line 65 and extends from the annular volume 21*a* of cylinder assembly 12 to the reservoir 24 through a normally open prefill valve 77, equivalent to prefill valve 70.

The outlets 62 and 63 of flow divider 46 are also connected to a leveling valve 78. Leveling valve 78 is a three-position, proportional, solenoid actuated valve, operated by solenoids 79 and 80. It will also be noted that leveling valve 78 is connected to reservoir 24 by line 81. When solenoid 79 is actuated, the leveling valve 78 is shifted to the right (as viewed in FIG. 2) and flow divider output line 63 is connected to reservoir 24 by line 81. Flow divider output line 62 is blocked. When solenoid 80 is actuated, the leveling valve 78 is shifted to the left (as viewed in FIG. 2) wherein flow divider output line 62 is connected to reservoir 24 by line 81, while flow divider output line 63 is blocked. The leveling valve 78 occupies its centered position when neither of the solenoids are energized. In its centered position, all ports are blocked. Solenoids 79 and 80 are actuated by outputs from processor 2. Processor 2 provides these signals in response to inputs it receives from linear potentiometers 82 and 83 associated with the left and right side of ram 8 (as viewed in FIG. 2) and constantly giving the vertical position of the left and right sides of ram 8.

Line 64 is connected to a shuttle valve 85 by a line 64*a* connected to line 64 just ahead of check valve 66. Similarly, line 71 is connected to shuttle valve 85 by a line 71*a* connected to line 71 just ahead of check valve 73. Shuttle valve 85 has an outlet 86 connected to a line 87 leading to pressure transducer 4. By virtue of shuttle valve 85, pressure transducer 4 will always read the highest of the cylinder assembly pressures beyond the flow divider. The output 86 of shuttle valve 85 is also connected by line 88 to a decompression valve 89 connected through a controlling orifice 90 to reservoir 24. Decompression valve 89 is two-position valve operated by solenoid 91. Solenoid 91 is actuated by an output from processor 2. When in its normal position, decompression valve 89 is closed. When actuated by solenoid 91, decompression valve opens line 88 to reservoir 24.

The outlet 86 of shuttle valve 85 is also connected by a line 92 to a relief valve 95. Relief valve 95 serves as a safety release beyond flow divider 46. In the previously mentioned working embodiment, relief valve 95 was preset to a pressure of 3600 p.s.i.

A pilot valve 93 is connected to line 61 which, in turn, is connected to pump output line 29. Pilot valve 93 is also connected to reservoir 24 by line 96. By line 97, pilot valve 93 is connected to line 98 leading to switching element 69. A line 99 branches from line 98 and leads to prefill valve 70. Similarly, line 97 is connected to line 100 which leads to switching element 76. Line 101 branches from line 100 and leads to prefill valve 77. Pilot valve 93 is actuated by solenoid 102 which, in turn, is actuated by an output from processor 2. In its unactuated position, pilot valve 93 blocks line 61 and connects lines 98, 99, 100 and 101 to reservoir 24 through lines 96 and 97. When actuated by solenoid 101, pilot valve 93 connects line 61 with lines 98, 99, 100 and 101. When this happens, switching elements 69 and 76 are opened, and normally opened prefill valves 70 and 77 are closed.

Finally, the circuit is completed by a shuttle valve 103. Shuttle valve 103 is connected to line 45 by line 104 and is connected to line 47 by line 105. Shuttle valve 103 will output the pressure of line 45 or line 47, whichever is the greater, to the pump load sensor 27 via line 106.

Reference is now made to FIG. 3 wherein an exemplary set of modes of operation are set forth. The table indicates which ones of the valve actuating solenoids are energized during a given mode. If a valve is actuated during a given mode, this will be indicated by "X" on the table. If a valve is unactuated during a given mode, this will be indicated by "—". It will be noted that in all of the modes except "POWER UP AND IDLE" and "EMERGENCY STOP" solenoids 79 and 80 are indicated with both a "—" and a "X". This is true because during all but the two aforementioned modes the solenoids 79 and 80 are actuated by outputs from processor 2, which are in response to inputs from linear potentiometers 82 and 83. Thus, at any given time in any one of the modes other than the two aforementioned modes, solenoids 79 and 80 may or may not be energized.

Figure 4:
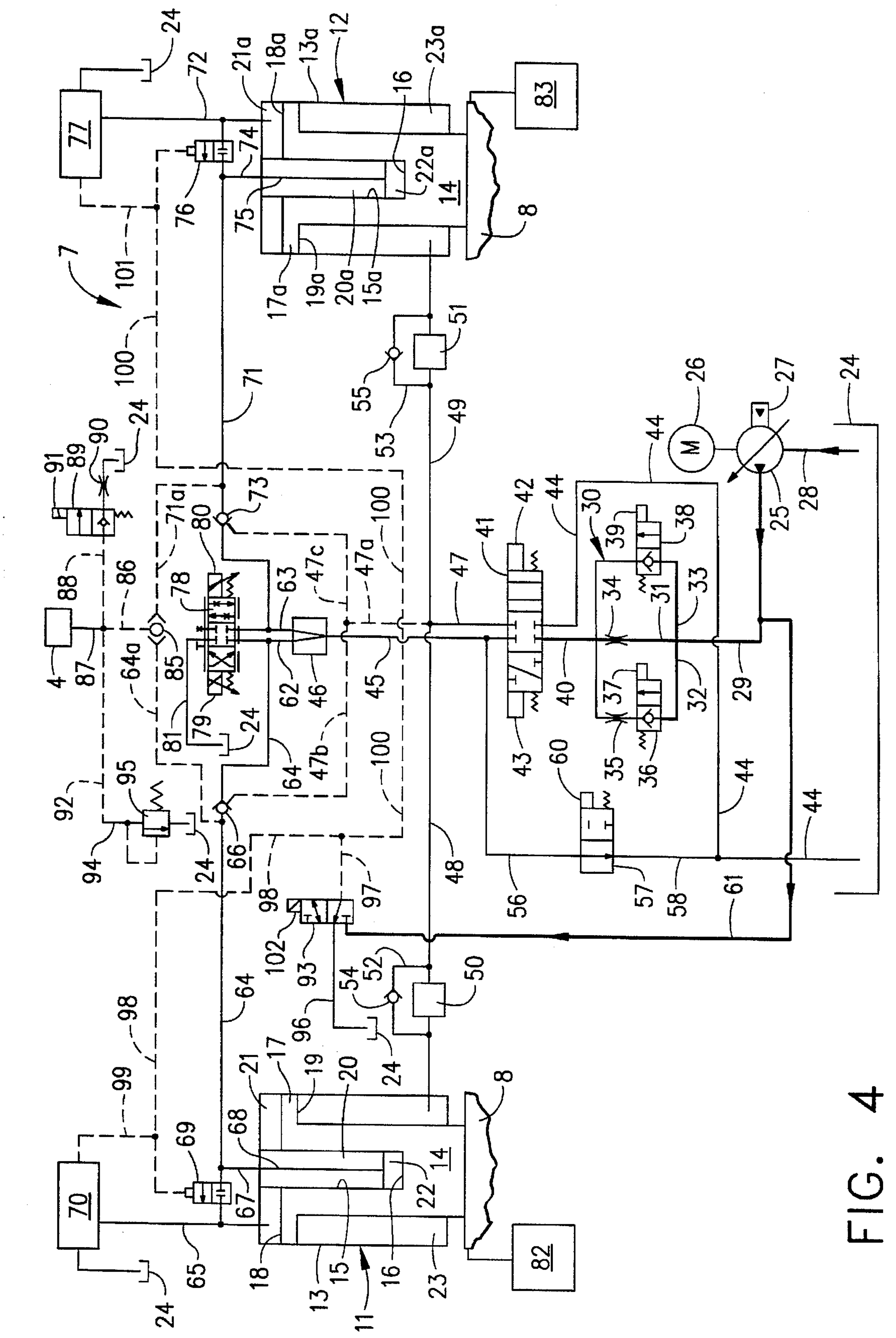
FIGS. 4–11 are flow diagrams illustrating selected ones of the modes of FIG. 3.

The first mode is a POWER UP AND IDLE mode which is illustrated in the simplified hydraulic circuit diagram of FIG. 4. The diagram of FIG. 4 is substantially similar to that of FIG. 2, but it has been condensed. Also, for purposes of simplicity, dumping valve 57 has been illustrated as a simple, normally open, two-position solenoid valve. It will be noted from the table of FIG. 3 that during the POWER UP AND IDLE mode, none of the valve-actuating solenoids are energized. As a result, when pump 25 is turned on, fluid will be drawn from reservoir 24 through line 28. The fluid will be conducted by output line 29 to lines 31, 32 and 33 of speed control assembly 30. Lines 32 and 33 are blocked, however, by normally closed valves 36 and 38. The fluid is conducted by open line 31 and orifice 34 to directional valve 41 where it is blocked. Fluid is also conducted by lines 29 and 61 to pilot valve 93 where it is blocked. The press brake is now ready to begin operation.

In order to save time, and therefore to increase productivity, it is generally desirable to bring ram 8 downwardly at a rapid rate. The ram 8 will approach the workpiece, but prior to contact it will be changed to one of the LOW FORMING MODE. MEDIUM FORMING MODE, or HIGH FORMING MODE. The position of the ram at which this mode change occurs is predetermined by the operator and is programmed in the processor 2. The reaching of the transition period will be signaled by the linear potentiometers 82 and 83.

Figure 5:
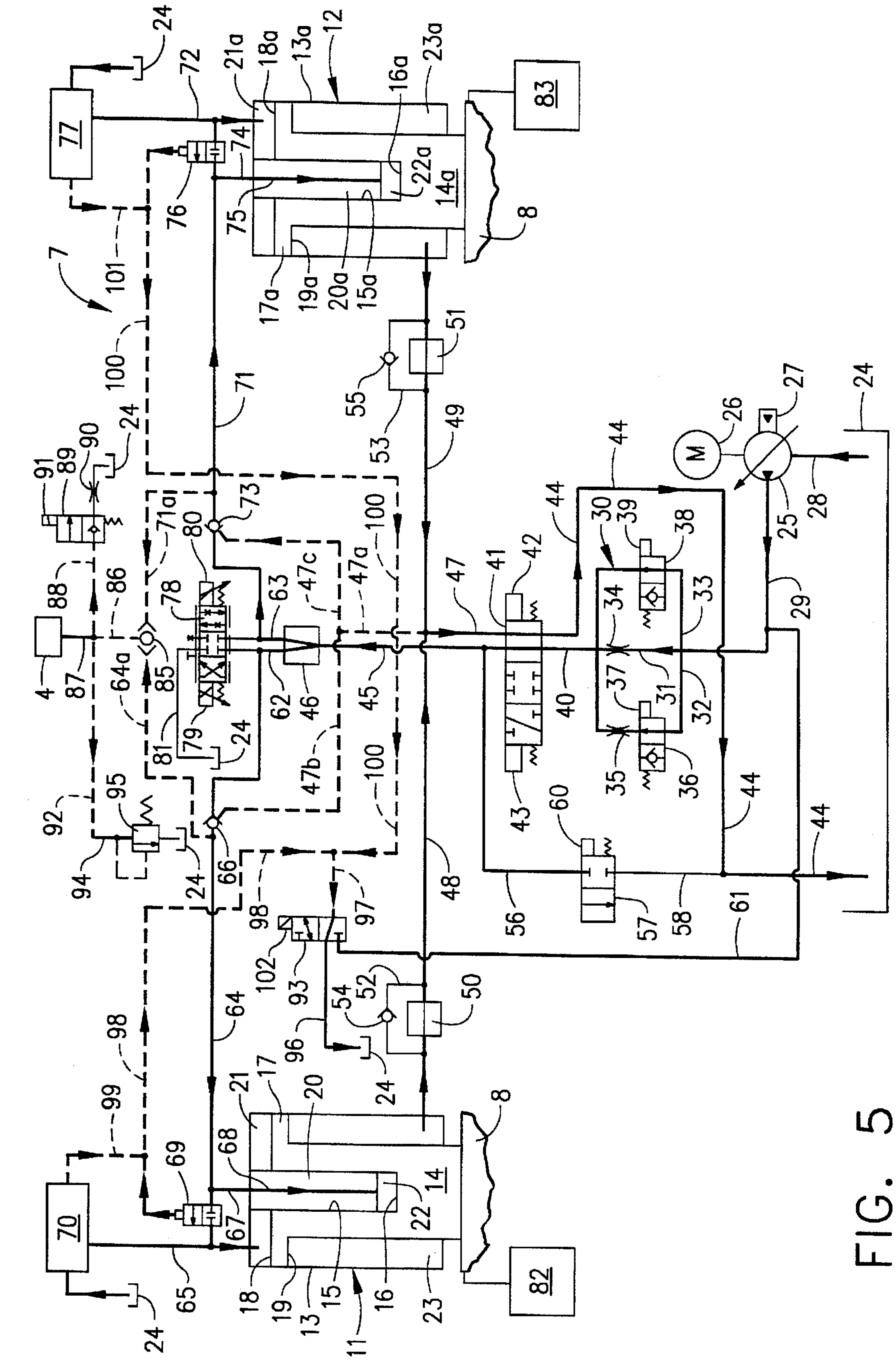

To initiate the RAPID APPROACH mode of FIG. 5, solenoids 37 and 39 are energized, opening valves 36 and 38. Thus, all of the lines 31, 32 and 33 of the speed control assembly 30 are open and the speed control assembly output line receives flow from orifice 34, orifice 35 and line 33. Solenoid 42 is energized, shifting directional valve to the left as viewed in FIG. 5. This allows fluid from output line 40 of speed control 30 to pass via line 45 to flow divider 46. From the flow divider 46, hydraulic fluid flows through flow divider output line 62, line 64, check valve 66 to line 67. Flow is blocked from line 65 by switching element 69. Fluid from line 67 passes through the passage 68 in plunger 20 to volume 22 whereupon it works upon small working surface 16 to shift piston 14 and ram 8 downwardly. In a similar fashion, fluid flow from flow divider output 63 passes through switching element 73 in line 71 to line 74. Flow is blocked from line 72 by switching element 76. From line 74, the flow proceeds through passage 75 in plunger 20*a* to the volume 22*a* and against the small working surface 16*a*. As a result, piston 14*a* and ram 8 shift downwardly simultaneously with piston 14 and ram 8. In order to permit pistons 14 and 14*a* to move ram 8 downwardly, their respective volumes 23 and 23*a* must diminish. To accomplish this, fluid flow passes from volumes 23 and 23*a* through lines 48 and 49, respectively and their respective counterbalance valves 50 and 51. The majority of the flow from lines 48 and 49 will pass through line 47 and directional valve 41 to line 44 by which it will be conducted to reservoir 24. A portion of the fluid from lines 48 and 49 will pass through pilot lines 47*a*, 47*b* and 47*c* to assure that check valve 66 and 73 are open.

Leveling valve 78 will function in the manner described heretofore. Shuttle valve 85 will receive fluid from either line 64*a* or line 71*a*, depending upon which of lines 64 and 71 provides the greater pressure. From shuttle valve 85, fluid will be transmitted to pressure transducer 4. As will be evident from FIG. 3, solenoid 102 of pilot valve 93 is not energized and the pilot valve is in its normal position shown in FIG. 5 wherein it blocks fluid in line 61. Pilot valve 93, however, allows pilot fluid from prefill valve 70 and switching element 69 to pass through lines 98, 97 and 96 to reservoir 24. Similarly, pilot fluid from prefill valve 77 and switching element 76 will pass through lines 100, 97, pilot valve 93 and line 96 to reservoir 24. As pistons 14 and 14*a* shift downwardly, and since prefill valves 70 and 77 are in their normal, open condition, a vacuum will be formed in volumes 21 and 21*a* and fluid will be drawn from reservoir 24 into volumes 21 and 21*a* above pistons 14 and 14*a*, respectively. This action of prefill valves 70 and 77 is known as "prefilling" and contributes to the speed of operation of the press brake by assuring that the upper annular volumes 21 and 21*a* are filled with hydraulic fluid in preparation for the working or forming stroke.

Figure 6:
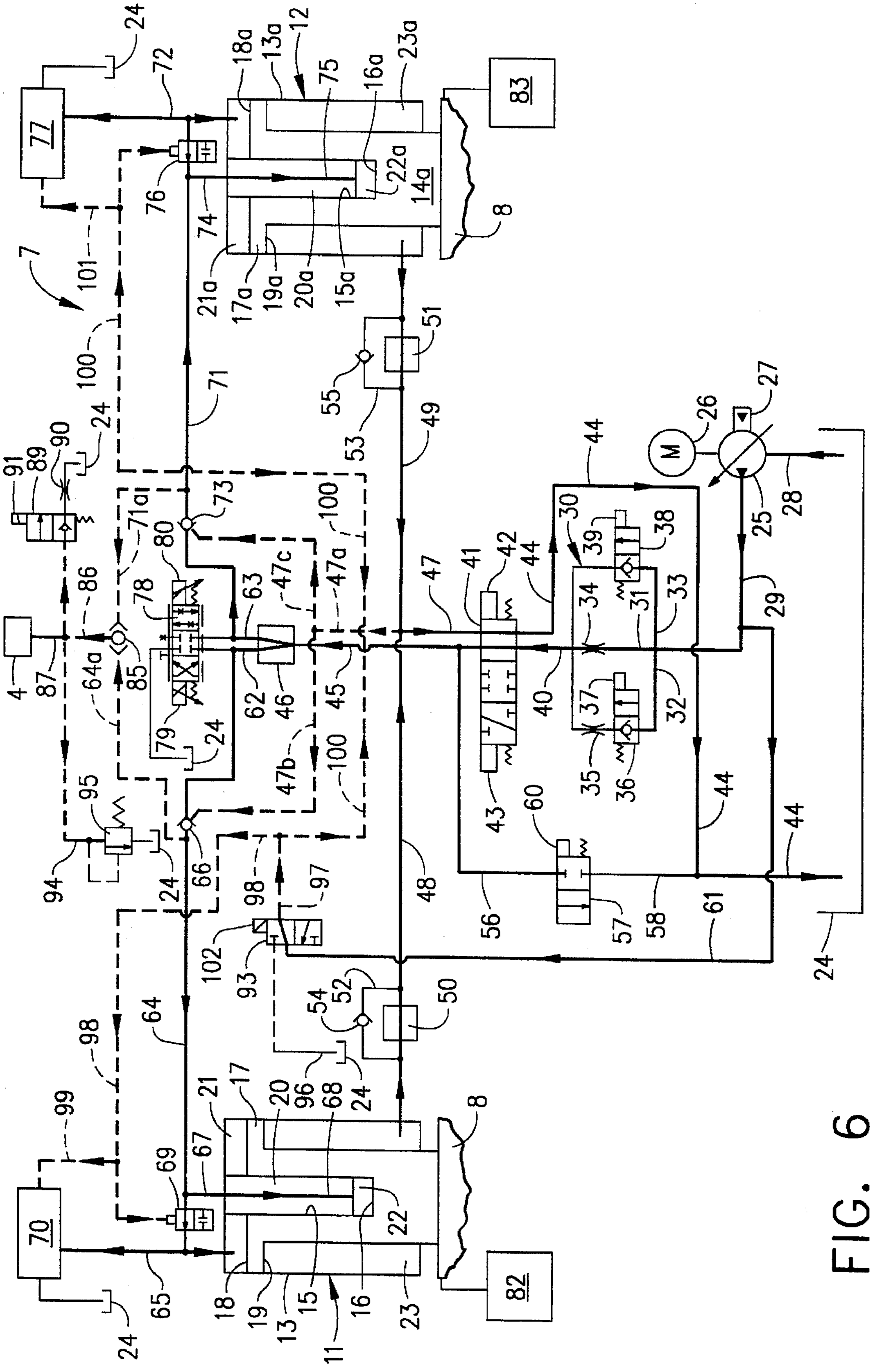

If at the predetermined end of the rapid approach mode, the operator chooses to perform the work stroke at low speed, he will have preprogrammed the FORMING LOW mode in processor 2. The FORMING LOW mode is schematically illustrated in FIG. 6.

In the forming LOW mode, fluid from pump 25 is directed via line 29 to speed control assembly 30. Lines 32 and 33 of the speed control assembly 30 are blocked by their respective valves 36 and 38, solenoids 37 and 39 being unactuated. Thus, fluid from only line 31 and small orifice 34 of speed control assembly 30 reaches speed control output line 40. Solenoid 42 of directional valve 41 is energized, shifting directional valve 41 to the left (as viewed in FIG. 6) causing flow from line 40 to pass through directional valve 41 to flow divider 46 via line 45. From flow divider output 62 hydraulic fluid passes via line 64 and check valve 66 to line 67 and to plunger passage 68 to volume 22. Similarly, hydraulic fluid from flow divider outlet 63 passes through line 71, check valve 73, line 74 and plunger passage 75 to volume 22*a*. Simultaneously, hydraulic fluid from annular volumes 23 and 23*a* of cylinder assemblies 11 and 12 pass through lines 48 and 49 and through counterbalance valves 50 and 51, respectively. Most of this fluid passes via line 47 through directional valve 41 to line 44 by which it is conducted to the reservoir 24. A very small portion of the fluid in lines 48 and 49 passes through line 47*a* and lines 47*b* and 47*c* to check valves 66 and 73.

Aside from the fact that only line 31 and orifice 34 of speed control assembly 30 are being used, the other major difference between the FORMING LOW mode and the RAPID APPROACH mode (FIG. 5) lies in the fact that solenoid 102 of pilot valve 93 is actuated in the FORMING LOW MODE, causing fluid from line 61 to pass through pilot valve 93 and line 98 to open switching element 69 and through line 99 to close prefill valve 70. In this way, hydraulic fluid in line 64 also enters line 65 (since switching element 69 is open) and therefore enters the annular volume 21 so that hydraulic pressure is exerted not only on small work surface 16 of piston 14, but also the larger annular work surface 18. This provides the pressure required to form the workpiece. Since prefill valve 70 is actuated, it prevents flow from lines 65 to the reservoir 24. In a similar fashion, hydraulic fluid from line 61 passes through pilot valve 93 and line 100 to open switching element 76 and via line 101 to actuate prefill valve 77, closing line 72 from the reservoir 24. With switching element 76 open, hydraulic fluid from line 71 also passes through line 72 to the annular volume **21*a* of cylinder assembly 12 so that hydraulic fluid is operating on the small work surface 16*a* and the large annular work surface 18*a* of piston 14*a* to drive ram 8 through the forming stroke. It will be noted that solenoid 60 is actuated, so that dumping valve 57** is closed.

Figure 7:
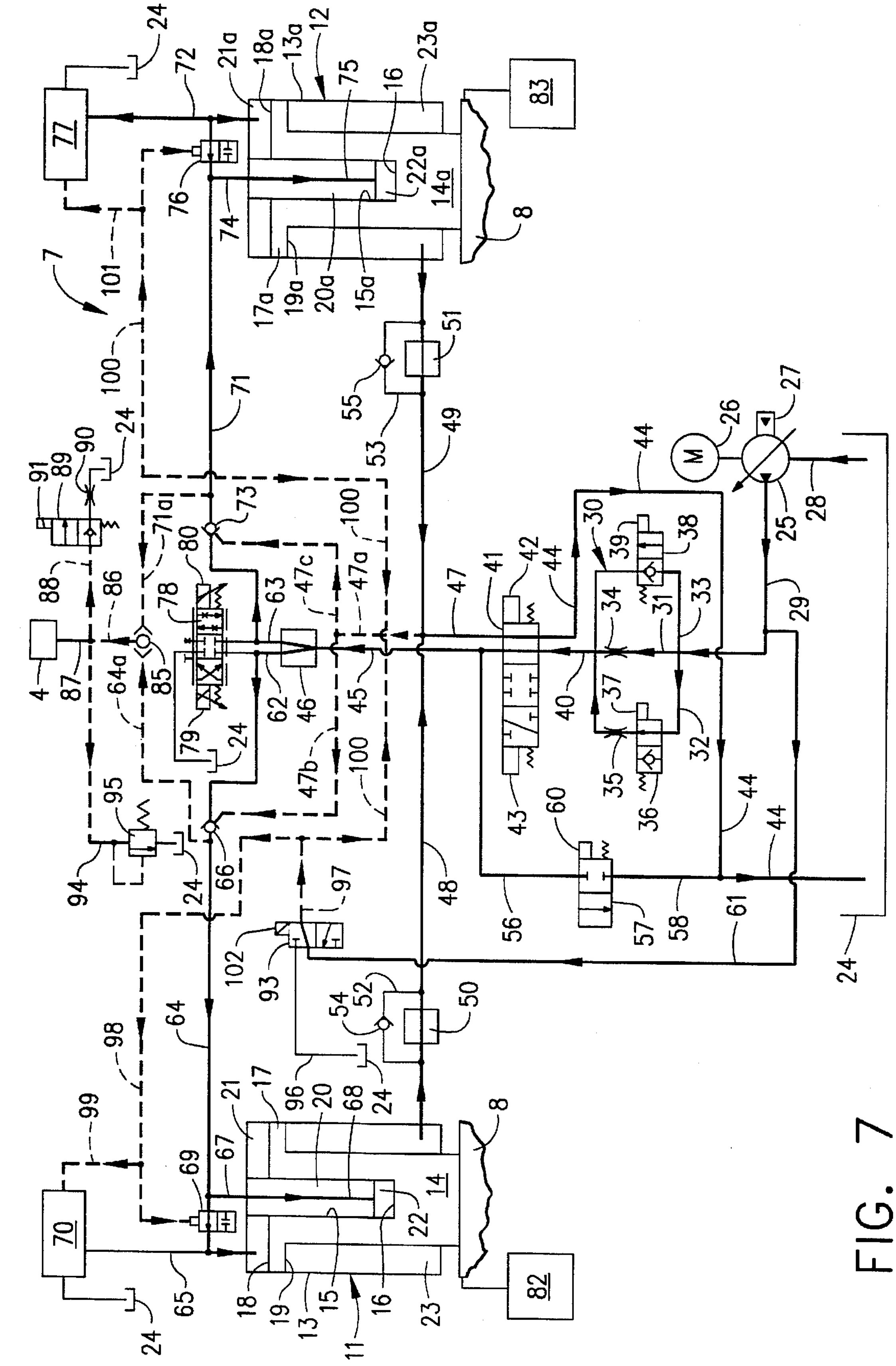

If the operator programs the processor 2 for the FORMING MEDIUM mode, the hydraulic circuitry of the present invention will be as shown schematically in FIG. 7. It will be noted that FIG. 7 is identical to FIG. 6 with one exception. In FIG. 7, solenoid 37 of valve 36 is actuated, opening line 32 of speed control assembly 30. As a result, the speed control assembly outlet line 40 receives fluid from both orifice 34 and orifice 35, thereby increasing the volume of hydraulic fluid flow and the speed of the forming step.

Figure 8:
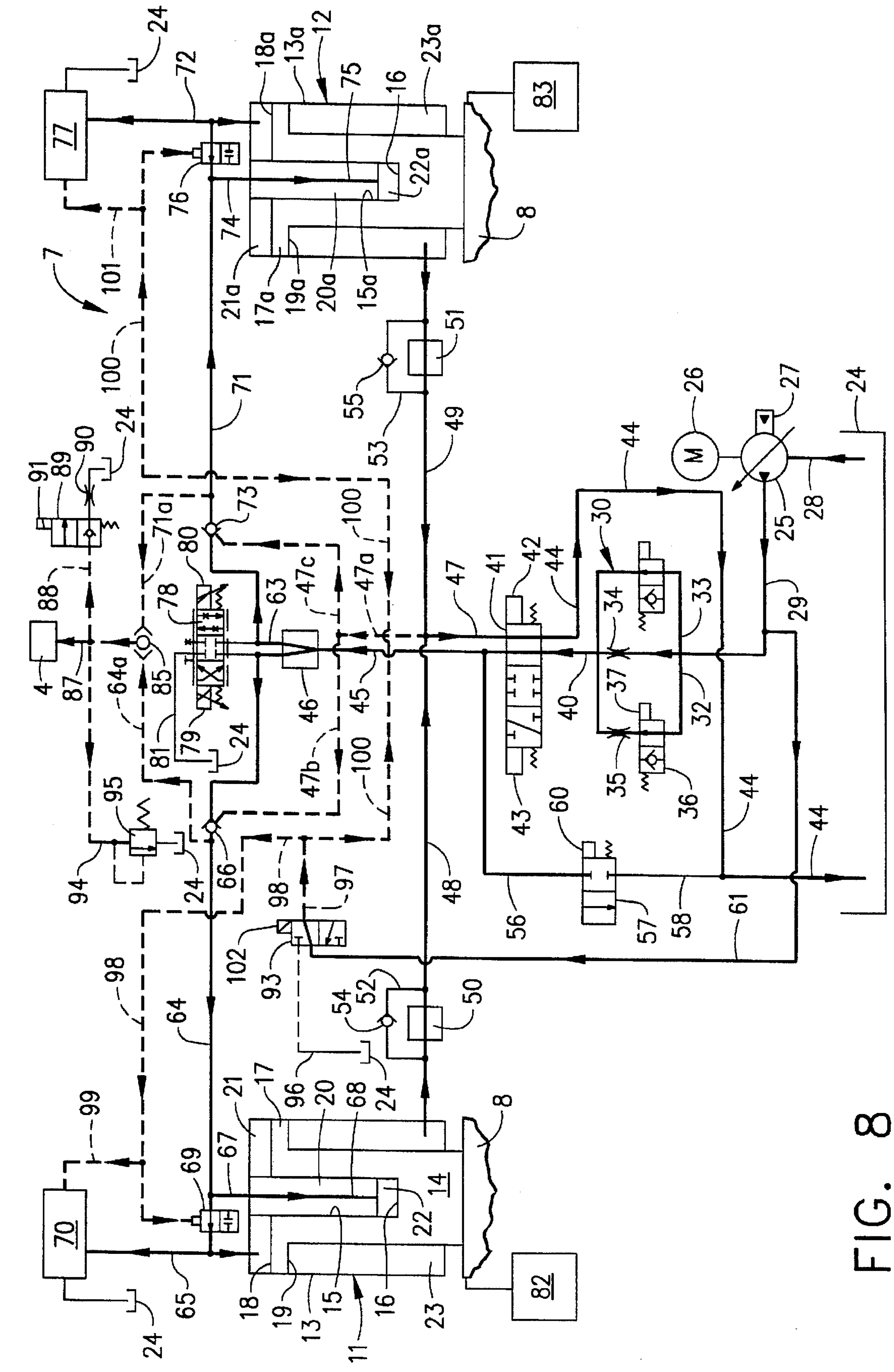

The FORMING HIGH mode is illustrated in FIG. 8 anti differs from the FORMING MEDIUM mode illustrated in FIG. 7 only in that solenoid 39 is also energized, shifting valve 38 and opening line 33. Thus, under the FORMING HIGH mode, the output line 40 receives hydraulic fluid from orifice 34, orifice 35 and line 33 of speed control assembly 30.

During the working or forming stroke of the press brake, the ram continues downwardly until a bottom point is reached. This point may be a particular ram position or a particular tonnage, preselected by the operator and entered into processor 2. In the case of a position reversal set point, downward motion of ram 8 continues until the particular bottom reversal position set point is reached, as determined by information derived from the linear potentiometers 82 and 83. In the case of a tonnage reversal set point, downward motion of the ram 8 continues until the predetermined tonnage reversal set point is detected by pressure transducer 4.

Regardless of which method is used to determine the bottom reversal set point, when this point is reached the processing reads the pressure as sensed by the pressure transducer 4. If the pressure is relatively low, for example less than 500 p.s.i., the direction of travel of the ram may be immediately reversed to permit withdrawal of the ram in the upward direction. However, if the pressure detected by pressure transducer 4 is greater than a predetermined value, processor 2 will call for the DECOMPRESSION mode to gradually relieve the pressure in the system.

When the press is under a heavily loaded condition, considerable energy is stored in the frame and hydraulic fluid under pressure. This is because of the inherent elastic deformation of the structure and the compressibility of the hydraulic fluid. If the fluid under pressure is suddenly released to the reservoir, the resulting surge and shock reduces the life of the hydraulic components in its path. Furthermore, this sudden decompression can also serve as a source of noise.

Figure 9:
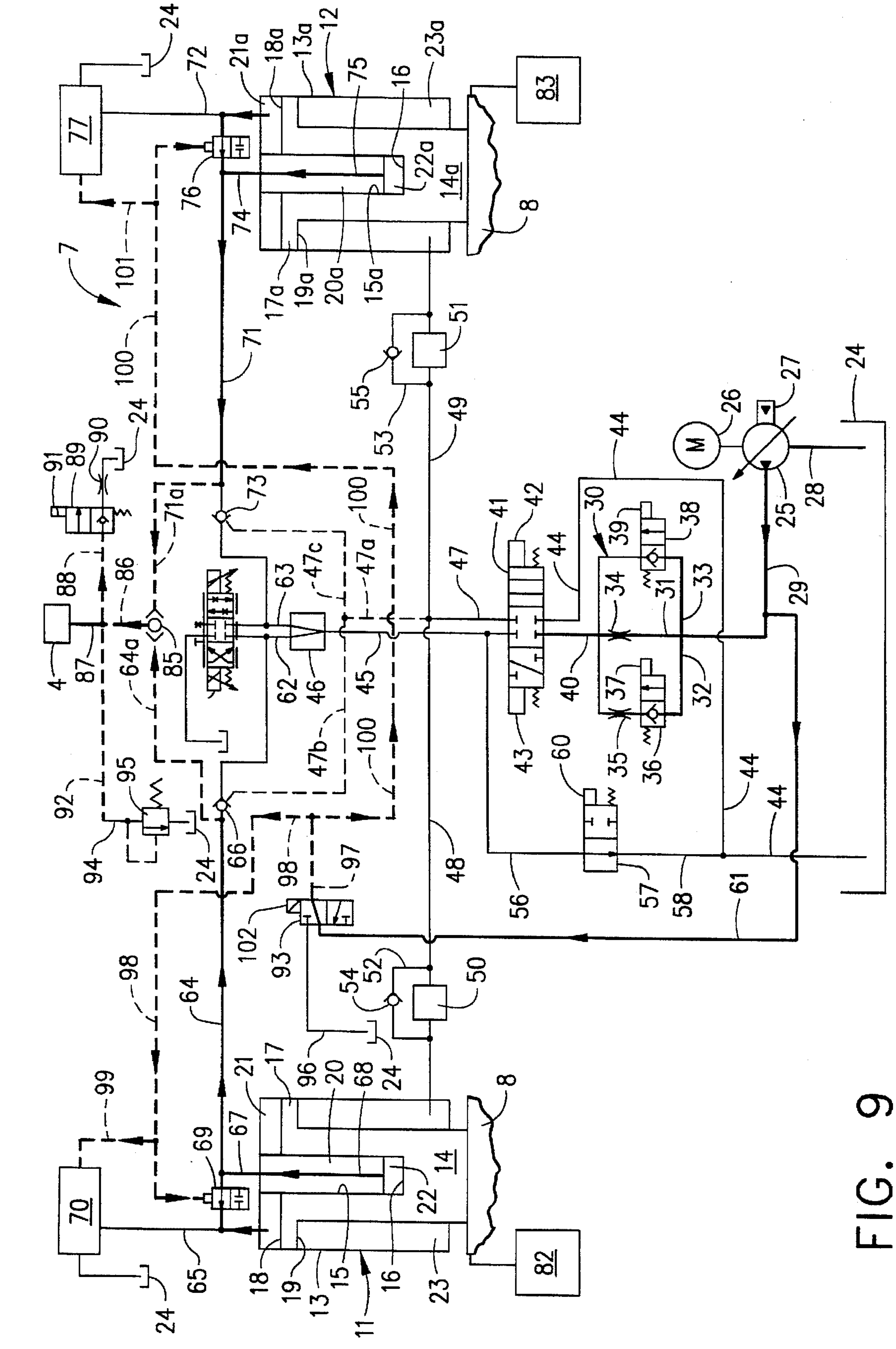

To alleviate this condition, in the event that the system pressure is relatively high, the system enters the DECOMPRESSION mode (see FIG. 9). In this mode, leveling valve 78 will continue to function, so that its solenoids 79 and 80, at any given time, may be either energized or de-energized. Of the remaining valve shifting solenoids, only solenoid 102 of pilot valve 93 and solenoid 91 of decompression valve 89 are energized. Actuation of pilot valve 93 will permit fluid from line 61 to enter lines 98 and 99 to open switching element 69 and close prefill valve 70. At the same time, fluid will pass through line 100 to open switching element 76 and line 101 to close prefill valve 77. As a result of this action, hydraulic fluid will flow from volume 21 of cylinder assembly 11 via line 65 and switching element 69 to line 64. Similarly, fluid from volume 22 will pass through the passage 68 of plunger 20, and line 67 to line 64. From line 64, the hydraulic fluid will pass through line **64*a* to shuttle valve 85. Similarly, pilot valve 93 will allow fluid from line 61 to enter lines 100 and 101 to open switching element 76 and close prefill valve 77. As a result, hydraulic fluid from volume 21*a* of cylinder assembly 12 will pass through line 72 and switching element 76 to line 71. Furthermore, fluid from volume 22*a* will pass through the bore 75 of plunger 20*a* and line 74 to line 71. This hydraulic fluid will be directed to shuttle valve 85 by line 71*a*. Shuttle valve 85 will shift back and forth allowing fluid from lines 64*a* and 71*a* (whichever is momentarily at the highest pressure), to flow through line 86 and line 88 to decompression valve 89. From decompression valve 89 the fluid will pass through restricting orifice 90 to reservoir 24**.

Relatively little hydraulic fluid need drain through decompression valve 89 and restrictive orifice 90 to the reservoir 24 to avoid surge and shock in the system. Decompression time is generally determined empirically, and may differ for different types of press brakes and different pressing tonnages and retraction speeds. In the particular exemplary embodiment described and illustrated herein, processor 2 will initiate one of the RETURN LOW mode or the RETURN HIGH mode upon completion of the DECOMPRESSION mode.

Figure 10:
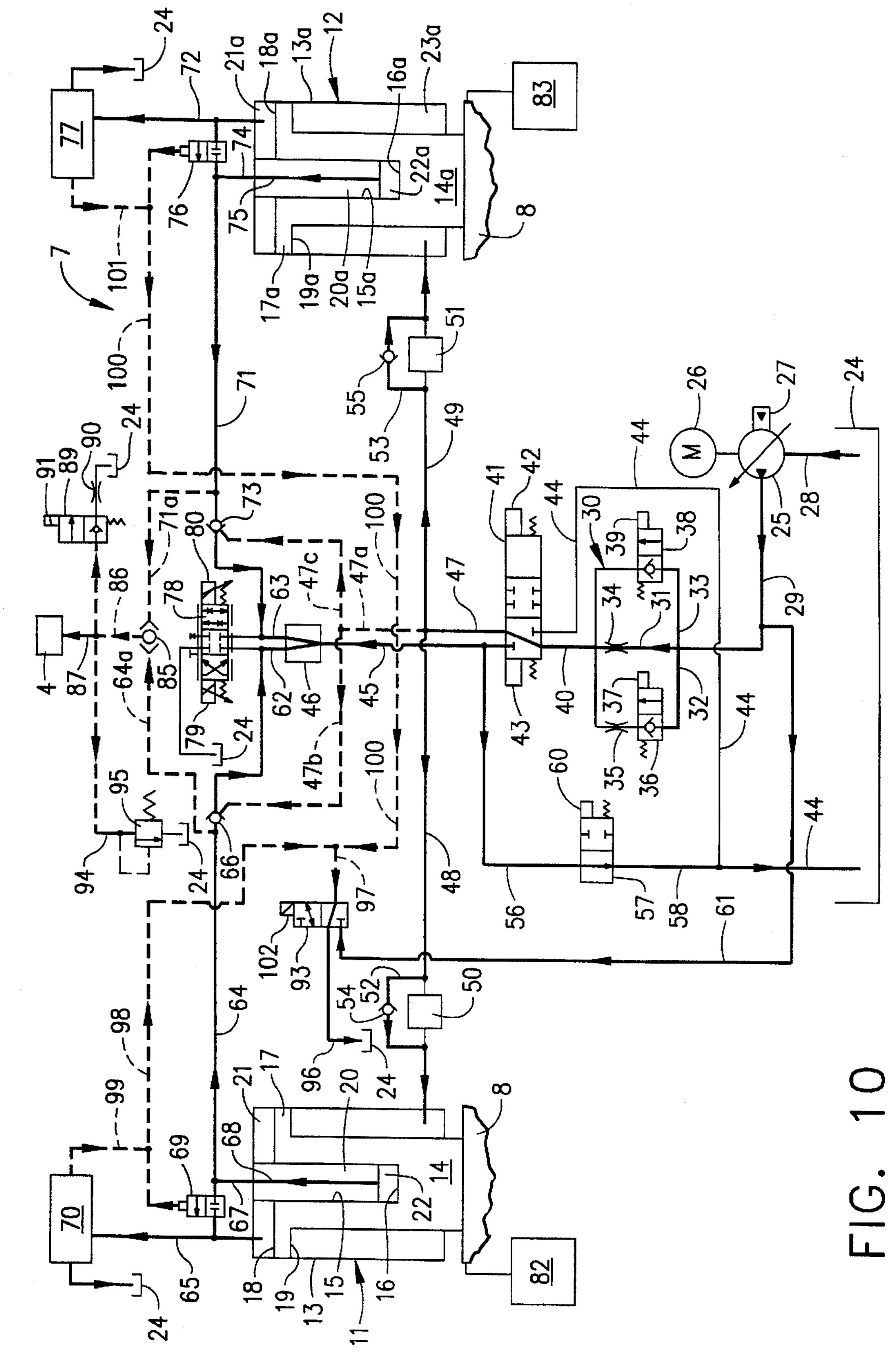

The RETURN LOW mode is schematically illustrated in FIG. 10. It will be noted that, in this mode, the leveling valve 78 will continue to function and one or the other of its solenoids 79 and 80 will be actuated from time-to-time, as is indicated in the table of FIG. 3. The only other valve-shifting solenoid energized in the RETURN LOW mode is solenoid 43 which shifts directional valve 41 to the right (as viewed in FIG. 10). Fluid from pump 25 and pump output line 29 passes through only line 31 and orifice 34 of the speed control assembly 30. Directional valve 41 shifts the flow from speed control assembly outlet line 40 to line 47. Fluid from line 47 passes through lines 48 and 49 to the annular volumes 23 and **23*a* of cylinder assemblies 11 and 12, respectively. It will be noted that this last mentioned fluid does not pass through counterbalance valves 50 and 51, but rather through bypass lines 52 and 53 and their check valves 54 and 55, respectively. As indicated above, bypass lines 52 and 53 and check valves 54 and 55 may constitute a part of counterbalance 50 and 51, respectively. Hydraulic fluid in line 47 also passes through line 47*a* and lines 47*b* and 47*c* to open check valves 66 and 73. As a result of this, fluid from volume 22 beneath plunger 20 is free to pass through plunger bore 68, line 67, line 64, line 62, flow divider 46, line 45, and line 56 to normally open dumping valve 57. From dumping valve 57 the hydraulic fluid is free to pass through lines 58 and 44 to reservoir 24. Similarly, fluid from volume 22***a* beneath plunger 20*a* is free to pass through plunger bore 75, line 74, line 71, line 63, flow divider 46, line 45, line 56, dumping valve 57, line 58 and line 44 to reservoir 24.

Pilot valve 93, with its solenoid 102 unactuated, permits hydraulic fluid from lines 99 and 98 to pass via lines 97 and 96 to reservoir 24. As a result of this, prefill valve 70 is open and switch element 69 is closed. This allows hydraulic fluid from the volume 21 of cylinder assembly 11 to drain to reservoir through prefill valve 70. In similar fashion, lines 101 and 100 drain to reservoir 24 via line 97, pilot valve 93 and line 96. This assures that switch element 76 is closed and prefill valve 77 is open, permitting drainage of the volume 21*a* of cylinder assembly 12 through line 72 and prefill valve to the reservoir 24. Since the fluid which results in the lifting of pistons 14 and 14*a* passes only through the small orifice 34 and line 31 of speed control assembly 30, pistons 14 and 14*a* raise relatively slowly.

It is also possible to return pistons 14 and 14*a* rapidly to their uppermost position by using the RETURN HIGH mode. The RETURN HIGH mode is schematically illustrated in FIG. 11.

Figure 11:
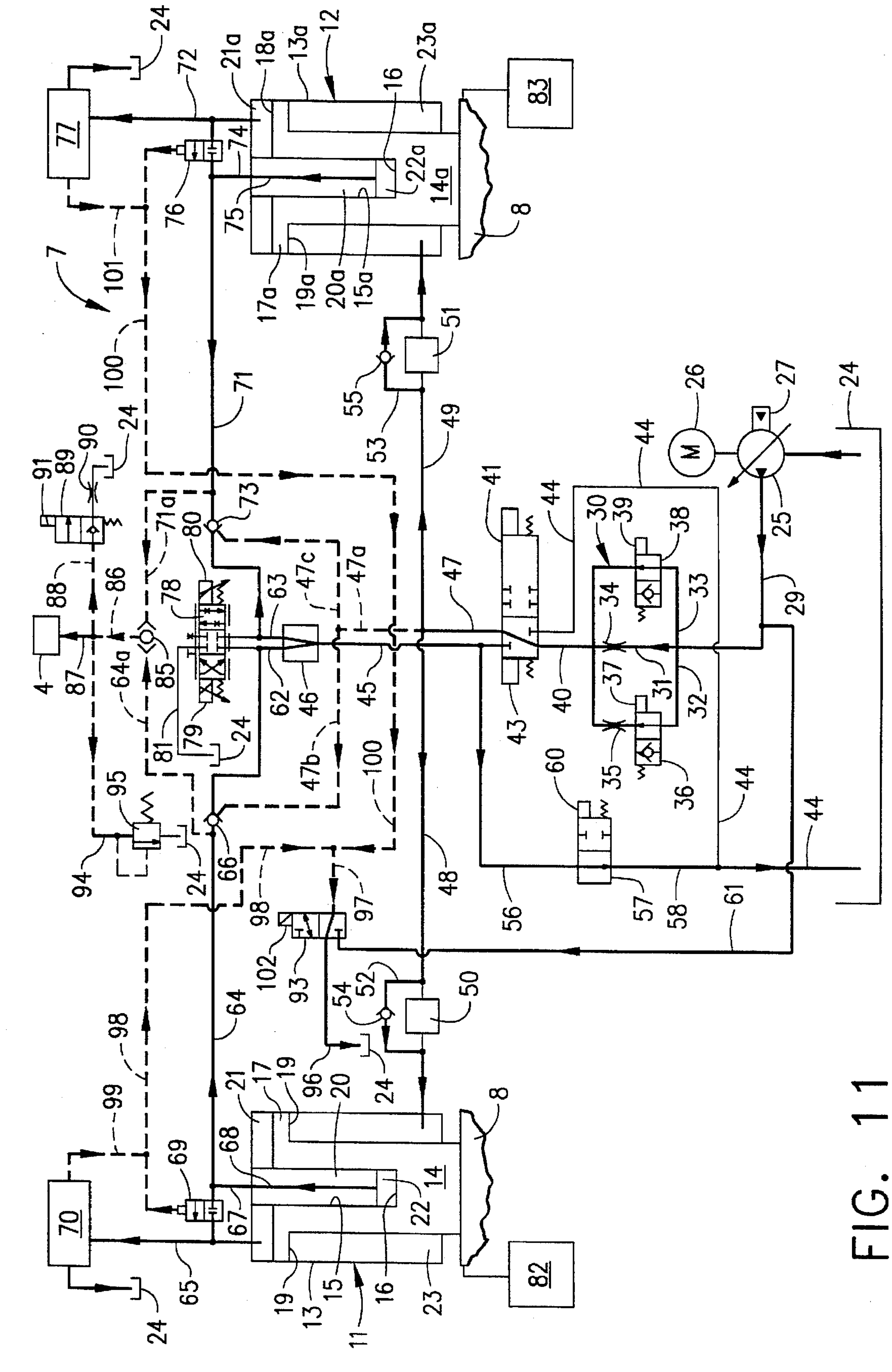

It will be immediately evident from FIG. 3 and from FIGS. 10 and 11 that the RETURN HIGH mode differs from the RETURN LOW mode only in that, in the RETURN HIGH mode solenoids 37 and 39 are actuated. This means that the output line 40 of speed control assembly 30 receives fluid from orifice 34, orifice 35 and line 33, rather than simply from orifice 34 as in the RETURN LOW mode. In all other respects, the circuit of FIG. 11 operates identically to that of FIG. 10.

It will be noted that the table of FIG. 3 includes a mode entitled DOWN STROKE STOP. It will be apparent that the DOWN STROKE STOP mode is identical to the POWER UP AND IDLE mode except that the solenoids 79 and 80 of leveling valve 78 continue to operate.

FIG. 3 illustrates an UP STROKE STOP mode wherein once again solenoids 79 and 80 of leveling valve 78 continue to function. The UP STROKE STOP mode is similar to the DOWN STROKE STOP mode with the exception that solenoid 102 is energized to shift pilot valve 93 to its actuated position. As a consequence of this, switching elements 69 and 76 are opened and prefill valves 70 and 77 are closed. Hydraulic fluid from volumes 22 and 23 of cylinder assembly 11 and volumes 22*a* and 23*a* of cylinder assembly 12 pass through open check valves 66 and 73, permitting these volumes to drain the reservoir 24 through dumping valve 57.

Finally, in the EMERGENCY STOP mode set forth in the table of FIG. 3, the circuit is the same as illustrated in FIG. 4 for the POWER UP AND IDLE mode.

The present invention having been described in detail, it will be evident that the control system of the present invention permits precise control of the upward and downward movement of ram 8 of the hydraulic press brake.

The table of FIG. 12 gives exemplary orifice sizes for orifice 34, orifice 35 and orifice 90, depending upon the size of the hydraulic press brake.

In the particular exemplary embodiment described, orifices are provided in lines 31 and 32. No orifice is provided in line 33. The sizes of orifices 34 and 35 and line 33 are such that, when combined in speed control assembly output line 40, 300 p.s.i. differential pressure drop from line 29 to line 45 or 47 can be achieved.

It will be understood by one skilled in the art that the speed control assembly 30 can provide a very large number of combinations for speed control. It would be possible to put an orifice in line 33. It would be possible for that orifice and orifices 34 and 35 to all be the same size or to be of different sizes. Finally, additional lines with additional orifices and additional control valves could be added to the speed control assembly for specialized or extremely precise speed control of ram 8.

It will be obvious from the above that speed control assembly 30 could also provide an APPROACH MEDIUM and APPROACH LOW modes. Furthermore any combination of approach, forming and return speeds could be programmed into processor 2 by virtue of the nature of speed control 30.

Modifications may be made in the invention without departing from the spirit of it.

What is claimed:

1. A system for controlling the movement of the ram of a press brake having a ram and first and second cylinder assemblies with pistons operatively attached to the top of said ram adjacent the sides thereof, said control system comprising a programmable processor, a pressure transducer providing output signals to said processor indicating the pressure applied to said pistons, a linear potentiometer for each of said ram sides providing output signals to said processor including ram position and levelness, a hydraulic circuit comprising a reservoir for hydraulic fluid, a variable volume load sense-controlled pump having an inlet line connected to said reservoir, a speed control assembly, a directional valve with two actuating solenoids, a flow divider, said pump having an output line supplying hydraulic fluid through said speed control assembly, said dual solenoid actuated directional valve and said flow divider to said first and second cylinders, said speed control assembly comprising at least first and second lines connected to said output line of said pump and connected to a speed control assembly outlet line to said directional valve, a restricting orifice being located in at least one of said at least two lines of said speed control assembly, a normally closed solenoid actuated valve being located in at least one of said at least two speed control assembly lines, said processor having an output to actuate the solenoid of each solenoid actuated valve of said hydraulic circuit.

2. The control system claimed in claim 1 wherein the piston of each of said first and second cylinder assemblies has an axial bore terminating in a small working area, each piston has an upper end with an annular flange providing an upper surface constituting an upper annular working area and a lower surface constituting a lower annular working area, each cylinder has an axial plunger having a sliding fit within the axial bore of its respective piston, each cylinder and piston assembly defines an upper annular volume at the top of the cylinder, a lower volume at the end of the plunger and an outer annular volume beneath said piston flange, said lower volume of each cylinder assembly is connectable to said reservoir and said speed control assembly by said directional valve, said flow divider, a check valve and an axial bore through its respective plunger, said upper annular volume of each cylinder assembly is connectable to said speed control assembly through said directional valve, said flow divider, its respective check valve and a normally closed switching element, said upper annular volume of each cylinder assembly is also connected to said reservoir through a normally open prefill valve, said outer annular volume of each cylinder assembly is connectable to said speed control assembly and said reservoir by said directional valve with a counterbalance valve between said directional valve and each outer annular volume, a check valve containing bypass for each counterbalance valve such that hydraulic fluid flowing to said annular volumes from said directional valve passes through said counterbalance valve bypasses and hydraulic fluid flowing from said outer annular volumes to said directional valve passes through said counterbalance valves.

3. The control system claimed in claim 2 wherein said directional valve with neither of its solenoids energized by an output signal from said processor assumes an unactuated position blocking hydraulic fluid from said pump to said cylinder assemblies and from said cylinder assemblies to said reservoir through said directional valve, when a first of said two solenoids is energized by an output signal from said processor said directional valve assumes a first actuated position allowing flow of hydraulic fluid from said pump to said outer annular volumes of said cylinder assemblies, and when said second of said two solenoids is energized by an output signal from said processor said directional valve assumes a second actuated position allowing flow of hydraulic fluid to said lower volumes of said cylinder assemblies through said plunger bores and allowing flow of hydraulic fluid from said cylinder assembly outer annular volumes through said directional valve to said reservoir.

4. The control system claimed in claim 3 including a solenoid actuated pilot valve supplying pilot hydraulic fluid from said pump output to open said normally closed switching elements and to simultaneously close said normally open prefill valves when said pilot valve is actuated by an output signal from said processor and to drain said pilot hydraulic fluid to said reservoir when unactuated.

5. The control system claimed in claim 4 including a normally open dumping valve connected between said directional valve and said flow divider and to said reservoir, a solenoid actuated pilot valve closing said normally open dumping valve upon receipt of an output signal from said processor.

6. The control system claimed in claim 5 including a shuttle valve connected between said flow divider and said first cylinder assembly and between said flow divider and said second cylinder assembly, said shuttle valve having an output connected to said pressure transducer and a solenoid actuated normally closed decompression valve openable by its solenoid when actuated by an output signal from said processor, a decompression orifice, said decompression valve being connected to said reservoir through said decompression orifice, a relief valve, said shuttle valve output also being connected to said relief valve.

7. The control system claimed in claim 6 including a leveling valve operated by first and second solenoids, said flow divider having first and second outputs, said leveling valve when actuated by said first solenoid connecting said first flow divider output to said reservoir, said leveling valve when actuated by said second solenoid connecting said second flow divider output to said reservoir, said first and second solenoids being operated by output signal from said processor in response to output signal to said processor from said linear potentiometers.

8. The control system claimed in claim 7 wherein said speed control assembly comprises said first and second lines and a third line connected to said output line of said pump and connected to said speed control assembly output line to said directional valve, a restrictive orifice in said first line, a restrictive orifice in said second line, a normally closed solenoid actuated valve in said second line upstream of said restrictive orifice therein, and a normally closed solenoid actuated valve being located said third line, said processor having outputs to actuate the solenoid of each of said normally closed valves of said second and third lines.

9. The control system claimed in claim 8 wherein said control system has a power up and idle mode and an emergency stop mode wherein none of said solenoid actuated valves and switches are actuated by said processor such that said normally closed solenoid valves in said second and third speed control assembly lines are closed, said directional valve is in its intermediate position, said normally open dumping valve and prefill valves are open and said normally closed switching elements are closed, said ram being stationary.

10. The control system claimed in claim 8 wherein said control system has a rapid approach mode wherein said leveling valve functions in accordance with output signals from said linear potentiometers and resultant output signals from said processor, the second solenoid of said directional valve is energized by an output signal from said processor shifting said directional valve to its second actuated position connecting said outer annular volumes of said cylinder assemblies to said reservoir and said lower volumes of said cylinder assemblies to said speed control, normally closed solenoid valves in said second and third speed control assembly lines being opened by output signals from said processor for maximum flow of hydraulic fluid to said lower volumes of said cylinder assemblies and said pilot valve of said dumping valve is actuated by an output signal from said processor to close said normally open dumping valve.

11. The control system claimed in claim 8 wherein said control system has a forming low mode wherein said leveling valve functions in accordance with output signals from said linear potentiometers and resultant output signals from said processor, said first solenoid of said directional valve is energized by an output signal from said processor shifting said directional valve to its first actuated position connecting said outer annular volumes of said cylinder assemblies to said reservoir and said lower volumes of said cylinder assemblies to said speed control, said pilot valve is actuated by an output signal from said processor to shift said switching elements to their open positions and said prefill valves to their closed positions thereby connecting said upper annular volumes to said speed control assembly, said normally closed solenoid valves in said second and third lines of said speed control remain closed for minimum flow of hydraulic fluid to said lower volumes and said upper annular volumes of said cylinder assemblies, and said pilot valve of said dumping valve being actuated by an output signal from said processor to close said normally open dumping valve.

12. The control system claimed in claim 8 wherein said control system has a forming medium mode wherein said leveling valve functions in accordance with output signals from said linear potentiometers and resultant output signals from said processor, said first solenoid of said directional valve is energized by an output signal from said processor shifting said directional valve to its first actuated position connecting said outer annular volumes of said cylinder assemblies to said reservoir and said lower volumes of said cylinder assemblies to said speed control, said pilot valve is actuated by an output signal from said processor to shift said switching elements to their open positions and said prefill valves to their closed position thereby connecting said upper annular volumes to said speed control assembly, said normally closed solenoid actuated valve in said second line of said speed control assembly being opened by an output signal from said processor and said normally closed solenoid actuated valve in said third line of said speed control assembly remaining closed for medium hydraulic fluid flow to said lower volumes and said upper annular volumes of said cylinder assemblies, said pilot valve of said dumping valve being actuated by an output signal from said processor to close said normally open dumping valve.

13. The control system claimed in claim 8 wherein said control system has a forming high mode wherein said leveling valve functions in accordance with output signals from said linear potentiometers and resultant output signals from said processor, said first solenoid of said directional valve is energized by an output signal from said processor shifting said directional valve to its first actuated position connecting said outer annular volumes of said cylinder assemblies to said reservoir and said lower volumes of said cylinder assemblies to said speed control, said pilot valve is actuated by an output signal from said processor to shift said switching elements to their open position and prefill valves to their closed position thereby connecting said upper annular volumes to said speed control, said normally closed solenoid actuated valves in said second and third lines of said speed control assembly being opened by output signals from said processor for maximum flow of hydraulic fluid to said lower volumes and said upper annular volumes of said cylinder assemblies, and said pilot valve of said dumping valve is actuated by an output signal from said processor to close said normally open dumping valve.

14. The control system claimed in claim 8 wherein said control system has a return high mode wherein said leveling valve functions in accordance with output signals from said linear potentiometers and resultant output signals from said processor, said second solenoid of said directional valve is energized by an output signal from said processor shifting said directional valve to its second actuated position connecting said outer annular volumes of said cylinders to said speed control assembly, said normally open prefill valves are open connecting said upper annular volumes of said cylinder assembly to said reservoir, said normally open dumping valve is open connecting said lower volumes of said cylinder assemblies to said reservoir, said pilot valve is unactuated connecting pilot fluid from said prefill valves and switching elements to said reservoir and said normally closed solenoid actuated valves in said second and third lines of said speed control assembly remain closed for minimum hydraulic flow to said outer annular volumes of said cylinder assemblies.

15. The control system claimed in claim 8 wherein said control system has a return high mode wherein said leveling valve functions in accordance with output signals from said linear potentiometers and resultant output signals from said processor, said second solenoid of said directional valve is energized by an output signal from said processor shifting said directional valve to its second actuated position connecting said outer annular volumes of said cylinders to said speed control assembly, said normally open prefill valves are open connecting said upper annular volumes of said cylinder assembly to said reservoir, said normally open dumping valve is open connecting said lower volumes of said cylinder assemblies to said reservoir, said pilot valve is unactuated connecting pilot fluid from said prefill valves and switching elements to said reservoir and both of said normally closed solenoid actuated valves in said second and third lines of said speed control assembly are opened by output signals from said processor for maximum flow of hydraulic fluid to said outer annular volumes of said cylinder assemblies.

16. The control system claimed in claim 8 wherein said control system has a down stroke stop mode wherein said leveling valve functions in accordance with output signals from said linear potentiometers and resultant output signals from said processor, none of the receiving solenoid actuated valves and switches are actuated by said processor such that said normally closed solenoid valves in said second and third speed control assembly lines are closed, said directional valve is in its intermediate position, said normally open dumping valve and prefill valves are open and said normally closed switching elements are closed, said ram being stationary.

17. The control system claimed in claim 8 wherein said control system has an up stroke stop mode wherein said leveling valve functions in accordance with output signals from said linear potentiometers and resultant output signals from said processor, said pilot valve is energized by an output signal from said processor opening said switch elements and closing said prefill valves enabling said upper annular volumes and said lower volumes of said cylinder assemblies to drain to said reservoir through said normally open dumping valve, none of the receiving solenoid actuated valves are actuated by said processor such that said normally closed solenoid valves in said second and third speed control assembly lines are closed, said directional valve is in its intermediate position, and said ram is stationary.

18. The control system claimed in claim 8 wherein said control system has a decompression mode wherein said leveling valve functions in accordance with output signals from said linear potentiometers and resultant output signals from said processor, said pilot valve is actuated by an output signal from said processor and said decompression is opened by a signal from said processor, said prefill valves will be closed and said switch elements will open allowing hydraulic fluid to flow from said lower volumes of said cylinder assemblies through said shuttle valve and said decompression valve and decompression orifice to said reservoir, none of the receiving solenoid actuated valves and switches are actuated by said processor such that said normally closed solenoid valves in said second and third speed control assembly lines are closed, said directional valve is in its intermediate position, said normally open dumping valve and prefill valves are open and said ram is stationary.

19. A speed control assembly for a press of the type having a ram, at least one cylinder and piston assembly operatively attached to said ram to raise and lower said ram, a reservoir for hydraulic fluid, a pump having an inlet line connected to said reservoir and an outlet line, a solenoid actuated directional valve connected to said at least one cylinder and a programmable processor, said speed control assembly comprising at least first and second lines connected to said outlet line of said pump and to a speed control assembly outlet line to said directional valve, a restricting orifice being located in at least one of said at least two lines of said speed control assembly and a normally closed solenoid actuated valve being located in at least one of said at least two speed control assembly lines, said processor having an output to actuate said solenoid of said last mentioned valve.

20. The speed control assembly claimed in claim 19 wherein said speed control assembly comprises said first and second lines and a third line connected to said output line of said pump and connected to said speed control assembly output line to said directional valve, a restrictive orifice in said first line, a restrictive orifice in said second line, a normally closed solenoid actuated valve in said second line upstream of said restrictive orifice therein, and a normally closed solenoid actuated valve being located said third line, said processor having outputs to actuate the solenoid of each of said normally closed valves of said second and third lines.

21. The speed control assembly claimed in claim 20 wherein said cylinder and piston assembly comprises a first such assembly and including a second cylinder and piston assembly, said directional valve being connected to both cylinder and piston assemblies.

* * * * *